United States Patent [19]

Mickler

[11] Patent Number: 4,969,357
[45] Date of Patent: Nov. 13, 1990

[54] COMPENSATED THERMAL FLUX MASS FLOWMETER

[76] Inventor: Brian E. Mickler, 4028 Tamworth Rd., Fort Worth, Tex. 76116

[21] Appl. No.: 363,220

[22] Filed: Jun. 8, 1989

Related U.S. Application Data

[63] Continuation-in-part of Ser. No. 211,891, Jun. 27, 1988, Pat. No. 4,876,887.

[51] Int. Cl.$^5$ ............................................. G01F 1/68
[52] U.S. Cl. .............................. 73/204.11; 73/204.19
[58] Field of Search ........... 73/204.11, 204.18, 204.19, 73/204.25, 204.26, 294.27

[56] References Cited

U.S. PATENT DOCUMENTS 4,691,566 9/1987 Aine .
4,735,086 4/1988 Follmer .
4,790,181 12/1988 Aine ................................. 73/204.18

Primary Examiner—Herbert Goldstein
Attorney, Agent, or Firm—James E. Bradley

[57] ABSTRACT

A mass flowmeter for measuring the velocity of a fluid uses an active and a compensating sensor. The sensors generate heat when supplied with electrical power. A first heat sink is located a first gap from the first sensor in a direction substantially perpendicular to the direction of fluid flow. A second heat sink located a second gap from the second sensor in a direction substantially perpendicular to the direction of fluid flow. The dimension of the second gap is different from the dimension of the first gap. Electrical power supplied to the sensors causes a thermal flux to flow across the first gap from the first sensor to the first heat sink, and causes a thermal flux to flow from the second sensor across the second gap to the second heat sink. A measuring circuit computes the temperature rise of each of the sensors when supplied with power over the ambient temperature of the fluid. A computer divides the temperature rise of one of the sensors by the temperature rise of the other of the sensors to determine a ratio. The computer computes from that ratio and the power supplied to each of the sensors, the velocity of the fluid.

20 Claims, 3 Drawing Sheets

COMPENSATED THERMAL FLUX MASS FLOWMETER

CROSS-REFERENCE TO RELATED APPLICATION

This is a continuation-in-part of application Ser. No. 211,891, filed June 27, 1988, Brian E. Mickler, entitled THERMAL FLUX MASS FLOWMETER, now U.S. Pat. No. 4,876,887.

BACKGROUND OF THE INVENTION

1. Field of the Invention

This invention relates in general to devices for measuring fluid flow and in particular to a thermal mass flowmeter 2. Description of the Prior Art There are many different types of flowmeters for measuring velocity of a fluid. The term "fluid" as used in this application refers both to liquid and gas flow. One category of flowmeter is known as a "thermal" flowmeter. There are two general types of thermal flowmeters In one type, a flow pipe is employed with a passage for the fluid flow to be measured. One or more electric heaters are located in the flow or the sensor pipe. The heaters apply heat to the fluid as it flows through the sensor pipe. The temperature is measured at two different points in the sensor pipe. The difference in the temperature between the upstream and downstream points can be correlated to velocity.

In the second category of thermal mass flowmeters, a heater/temperature sensor is positioned on a boom and immersed into the flowing fluid stream. A circuit senses the temperature response of the sensor as a function of the mass fluid flow rate.

Each of these thermal flowmeters has in common the fact that the rate of heat flow into the fluid from the sensor is directly proportional to the mass flow rate of the fluid. The accuracy of these conventional thermal mass flowmeters is limited to a relatively narrow range of flow velocities. With low velocities, accuracy is limited by spurious heat losses due to convection and leakage into the environment. For high velocities, accuracy is limited by the finite thermal resistance of the sensor element or elements.

In order to avoid the high velocity range limitation, a common technique is to use a main pipe within which are contained laminar flow elements. These laminar flow elements are arranged to produce a certain pressure drop for the desired range of velocities to be measured. The pressure difference upstream and downstream of the laminar flow elements is proportional to the volume flow rate of the fluid to be measured.

A sensor pipe branches off from the main pipe and reenters downstream. This sensor pipe carries heating elements and sensors. A much smaller fluid flow will flow through the sensor pipe than the main pipe. The velocity of the flow in the sensor pipe is measured, it being proportional to the main velocity flowing through the main pipe. Even though this is workable, flow rates outside of the design range can still not be accurately measured without modifying the laminar flow elements.

In U.S. Pat. No. 4,517,838, Wachi et al., May 21, 1985, a heat conducting case is shown. The case has a fine groove in a sensor pipe. Heating means is mounted in the fine groove so as to measure the fluid flow. The small size of the sensor pipe necessitated by such a fine groove further restricts the high fluid velocity measurement capability of the flowmeter.

In U.S. Pat. No. 4,691,566, Sept. 8, 1987, Aine, a pair of sensors are used. One sensor is located upstream from the other. Power is applied to both of the sensors. The resistive difference between the upstream and downstream resistors is a function or the flow. Aine uses a bridge circuit to monitor the resistive difference between the two sensors. He holds the temperature difference constant by regulating the power. He computes the velocity based on the power supplied. A disadvantage is that the resistive difference between the two sensors as a function of flow increases up to a certain flow rate, then decreases.

SUMMARY OF THE INVENTION

In this invention, a sensor is placed in the main flow of the fluid. The sensor is capable of generating heat when supplied with electrical power. A heat sink is placed in the fluid directly across from the sensor, perpendicular to the direction of fluid flow.

Electrical power supplied to the sensor causes a thermal flux to flow from the sensor to the heat sink, which absorbs the heat. This thermal flux is modulated by the flowing fluid. Circuitry measures the temperature rise of the sensor above ambient and computes from that measurement and the power supplied the velocity of the flowing fluid.

In another embodiment, two identical sensors capable of generating heat when supplied with electrical power are placed in the main flow of the fluid. A heat sink is placed in the flowing fluid directly across from each sensor, perpendicular to the direction of fluid flow. The gap separating the first sensor from its heat sink is chosen to be different from the gap separating the second sensor from its heat sink.

Electrical power supplied to each of the sensors causes a thermal flux to flow from each of the sensors to its respective adjacent heat sink, which absorbs the heat. The thermal flux thus generated by each sensor is modulated by the flowing fluid. Circuitry measures the temperature rise of each sensor over the ambient temperature of the flowing fluid. A computer computes from these measurements and the power supplied to each of the sensors the velocity of the flowing fluid.

DESCRIPTION OF THE PREFERRED EMBODIMENT

Figure 1:
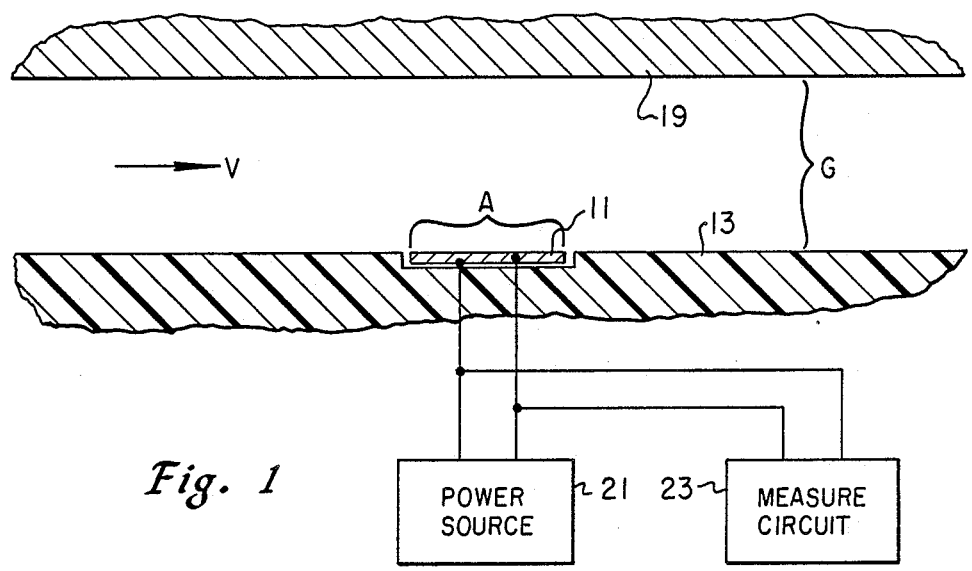
FIG. 1 is a schematic cross-sectional representation a first embodiment of the invention.
Figure 5:
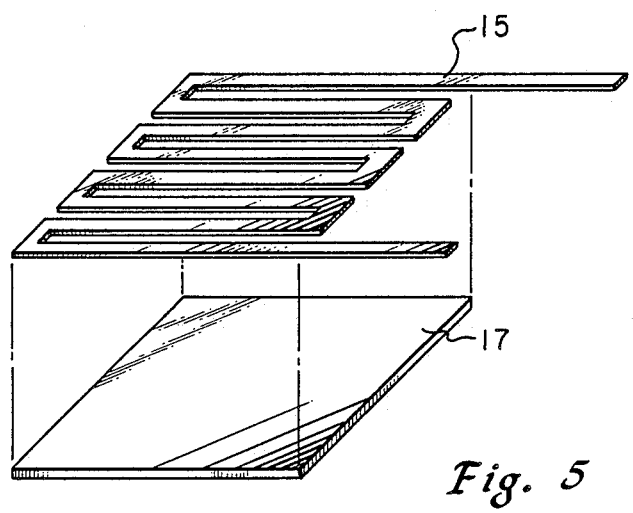
FIG. 5 is a schematic view illustrated in exploded form one of the sensors of the invention.

Referring to FIG. 1, a combination heat source/temperature sensor 11 is shown. The sensor 11 has an effective radiating area A and is shown mounted in an insulator 13 As illustrated in FIG. 5, sensor 11 has a thin layer or substrate 17 of material such as Kapton. The substrate 17 is coated or clad with a layer of temperature sensitive conductive metal 15, such as nickel The layer 15 is etched into a sinuous coil pattern in order to develop the desired value of nominal resistance. Sensors of this general type are commercially available.

Referring back to FIG. 1, a heat sink 19 is mounted directly across from sensor 11 at a predetermined gap or distance G. Heat sink 19 is a metal member that readily conducts heat, and thus attracts and absorbs the heat generated from sensor 11. The surface of the heat sink 19 is parallel with the surface of sensor 11.

A power source 21, such as a battery, supplies DC power to the sensor 11. A measuring circuit 23 measures the power supplied to the sensor 11. The measuring circuit 23 also measures the resistance of sensor 11 in a conventional manner. The sensor 11 has a resistance which will increase with the increase in temperature. Consequently, a comparison of the resistance at ambient and at an elevated temperature will provide an indication of how much the temperature of the sensor 11 rises above the ambient temperature.

The fluid which will be flowing parallel to the surface of the sensor 11 and heat sink 19 at a velocity V as indicated by the arrow.

The heat generated by the sensor 11 creates a thermal flux which flows directly from the sensor 11 to the heat sink 19. The space between the heat sink 19 and the sensor 11 is unobstructed so as to avoid impeding thermal flux flow. This thermal flux is modulated by the flowing fluid The increase above ambient of the temperature of the sensor 11 and the power supplied to the sensor 11 can be used to compute the velocity V of the flowing fluid.

This is determined as follows:
TR=temperature rise of sensors 11 above ambient temperature of the fluid
G=gap distance
W=power supplied
K=thermal conductivity of the fluid
A=effective radiating area
C=thermal capacity or specific heat of the fluid
D=density of the fluid
V=velocity of the flowing fluid Constant 1 and constant 2 are constants depending up on the units of measurement, which using British Engineering Units, are 482.4 and 103,000 respectively. The equation is as follows:

$$TR = (CONSTANT1*G*W/K*A)*EXP(-G*SQRT(CONSTANT2*C*D*V/K))$$

This unique equation has the remarkable property that the overall variation and sensitivity of TR (temperature rise of sensor 11 over ambient temperature of the fluid) can be dictated for any desired fluid type or range of velocity simply by specifying the gap dimension G. For example:

| | |
|---|---|
| Example 1 | For P = 0.4 watts |
| | G = 0.025 inches |
| | A = 0.3 sq. inches |
| | fluid type = air at std. temp. and pres. |
| | TR @ V = 0 fpm will be 100.5 degrees F. |
| | TR @ V = 20 fpm will be 74.5 degress F. |
| | TR @ V = 5000 fpm will be 0.8 degrees F. |
| Example 2 | For P = 2 watts |
| | G = 0.04 inches |
| | A = 0.3 sq. inches |
| | fluid type = water |
| | TR @ V = 0 fpm will be 30.99 degrees F. |
| | TR @ V = 0.1 fpm will be 21.23 degrees F. |
| | TR @ V = 20 fpm will be 0.7 degrees F. |

These two examples illustrate the high resolution theoretically available at both high and low flow rates for fluid as dissimilar as air and water using the thermal flux modulation technique for fluid velocity measurement.

Solving the above equation for the apparent fluid velocity V results in the following:

$$V=(K/CONSTANT2*C*D)*[LN((CONSTANT1*G*W/K*A*TR))/G]SQUARED$$

While workable, the actual performance of the thermal flux mass flowmeter illustrated in FIG. 1, differs somewhat at very high and very low velocities from that predicted by the above analysis. One difference is that the fluid velocity profile within the active gap G is not actually constant but is in fact dependent on the velocity and viscosity of the flowing fluids In addition, at very low velocities, the lines of thermal flux are in fact perpendicular to the sensor 11 and heat sink 19 only at the exact center of the sensor 11. This has the effect of making the effective radiating area A also function of fluid velocity V rather than constant as assumed in the above analysis Consider now the second embodiment shown in FIG. 2. In this embodiment, two sensors 25, 27 are utilized, both of the same type as sensor 11 of the first embodiment. Both are active sensors in that both generate heat when supplied with power. Sensors 25, 27 are mounted on opposite sides of an insulator 29. Insulator 29 serves as isolation means for isolating each sensor 25, 27 from the heat generated by the other. Sensor 25 is spaced from a heat sink 31 by a gap G. Sensor 27 is considered a compensating sensor and is spaced from another heat sink 33 by a gap GC. Both gaps G and GC are unobstructed so as to allow a thermal flux to flow directly from each sensor 25, 27 to the respective heat sinks 31, 33.

The gap GC between the sensor 27 and the heat sink 33 is different from the gap G between the sensor 25 and heat sink 31. The temperature rise TRC of the compensating sensor 27 can be expressed by the following relation analogous to the relation for TR shown in the above equation:

$$TRC=(CONSTANT1*GC*WC/K*A)EXP(-GC*SQRT(CONSTANT2*C*D*V/K))$$

where WC is the power supplied to the compensating sensor 27 and the other variables and constants are as previously defined.

The ratio of TR/TRC is as follows:

$$TR/TRC=[(CONSTANT1*G*W/K*A)*EXP(-G*SQRT(CONSTANT2*C*D*V/K)]/[(CONSTANT1*GC*WC/K*A)*EXP(-GC*SQRT(CONSTANT2*C*D*V/K)]$$

Hence $TR/TRC=(G*W/GC*WC)*EXP[-(G-GC)*SQRT(CONSTANT2*C*D*V/K)]$, and $(TR*GC*WC)/(TRC*G*W) = \text{EXP}[-(G-GC)*\text{SQRT}(\text{CONSTANT2}*C*D*V/K)]$, Solving the above equation for the apparent fluid velocity V:

V = (Weighting Factor)*[LN(TR*GC*WC/TRC*G*W)/(GC−G)]-SQUARED where the Weighting Factor = K/CONSTANT2*C*D.

Comparing this expression for apparent fluid velocity with the previous expression for V shows some advantages. As long as they remain equal, the computed apparent velocity is now independent of the effective radiating areas of the sensors 25, 27. Also, changes in the properties of the fluid no longer affect the linearity of the flowmeter. Corrections for homogeneous mixtures of various fluid types become simply a matter of determining the average physical coefficients for the mixture and using these to calculate the weighting factor used in the velocity calculation.

Figure 2:
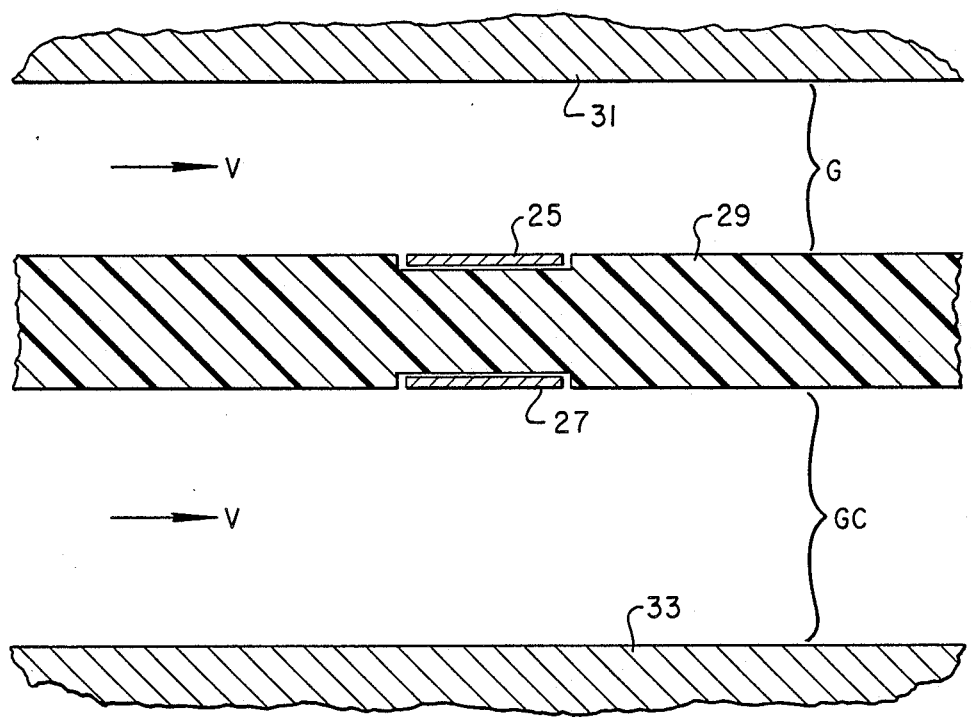
FIG. 2 is a schematic cross-sectional representation of a second embodiment of the invention.
Figure 3:
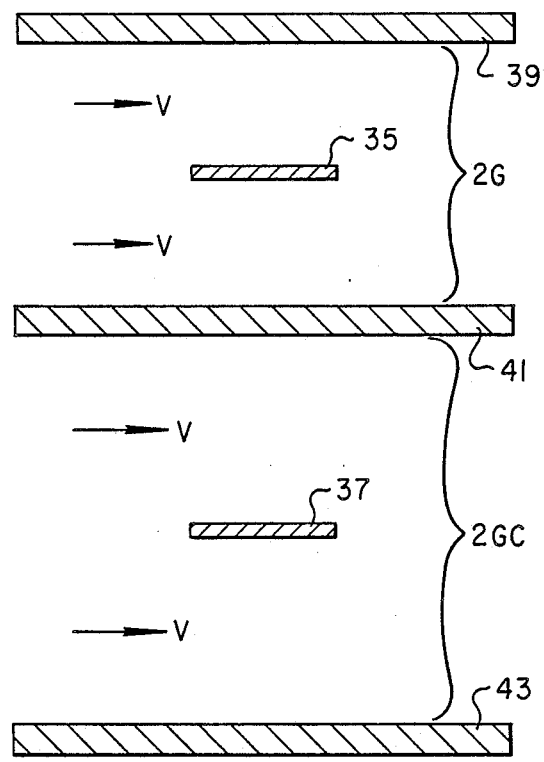
FIG. 3 is a schematic cross-sectional representation of a third embodiment of the invention.

The third embodiment shown in FIG. 3 illustrates how to minimize spurious heat losses from the second embodiment shown in FIG. 2. The insulator 29 has now been discarded. Two identical sensors 35, 37 will be used, each identical to the sensors 25, 27 of FIG. 2. Three parallel heat sinks 39, 41 and 43 are utilized. Both sensors 35, 37 are active in that both generate heat, but sensor 37 will be considered a compensating sensor. Active sensor 35 may be located equidistant between the two heat sinks 39, 41. Compensating sensor 37 may be located equidistant between the two heat sinks 41, 43. The heat sink 41 serves also as isolating means for isolating the sensors 35, 37 from the heat generated by each other. The gap 2G between the heat sinks 39, 41 differs from the gap 2GC between the heat sinks 41, 43.

Fluid is allowed to flow on both sides of each sensor 35, 37. Because of the thinness of the substrate of each sensor 35, 37, substantially equal amounts of heat will flow in both directions from each sensor 35, 37. The calculation of the apparent velocity V in this configuration remains unchanged from the configuration shown in FIG. 2.

Figure 4:
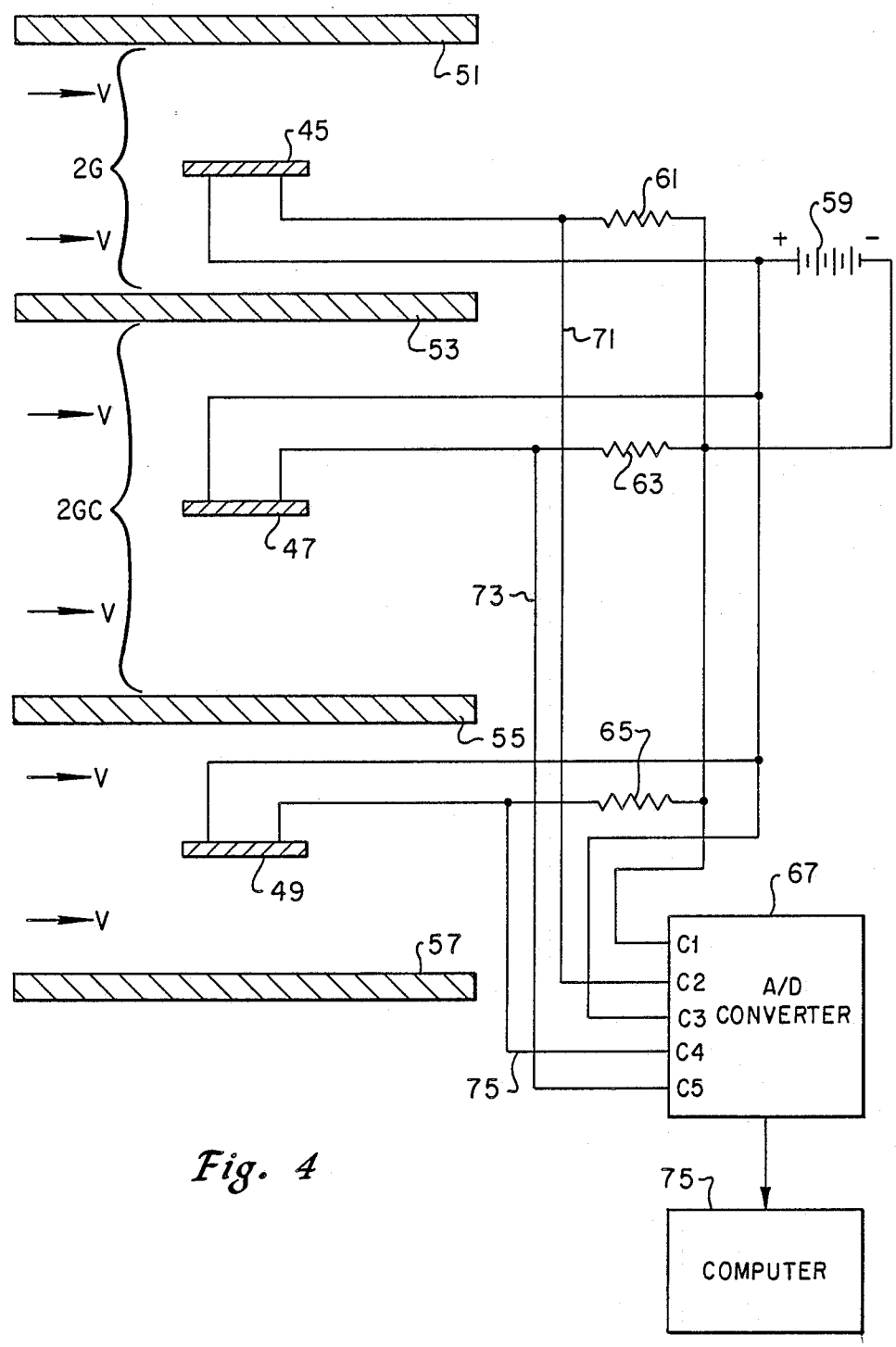
FIG. 4 is a schematic cross-sectional representation of a fourth embodiment of the invention.

A fourth embodiment, shown in FIG. 4, illustrates how to compensate for the varying temperatures of the fluid entering the thermal flux mass flowmeter. A pair of active sensors 45, 47 are utilized in the same manner as the sensors 35, 37 of FIG. 3. Both are active, but sensor 47 will be considered a compensating sensor. In addition, a reference sensor 49 will be utilized. The reference sensor 49 has thermal properties identical to the active sensors 45, 47, but the power supplied to the reference sensor 49 is much less than that supplied to each of the active sensors 45, 47. Preferably the power is about one hundredth of that supplied to each of the active sensors 45, 47. The reference sensor 49 is employed for measuring the ambient temperature of the flowing fluid.

Four heat sinks 51, 53, 55 and 57 are utilized. Active sensor 45 is located between heat sinks 51, 53. Compensating active sensor 47 is located between heat sinks 53, 55. The gap 2G separating the heat sinks 51, 53 differs from the gap 2GC separating the heat sinks 53, 55.

The reference sensor 49 is isolated from any heat generated by the active sensors 45, 47. Likewise, each sensor 45, 47 is isolated from any heat generated by the other. Because of the low power supplied to the reference sensor 49, its resistance will be directly proportional to the temperature of the flowing fluid.

The calculation of the apparent velocity V in this configuration remains the same as before, except that the temperature rise TR is now equal to the temperature of the primary active sensor 45 less the temperature of the reference sensor 49. The compensated temperature rise TRC is now equal to the temperature of the compensating active sensor 47 less the temperature of the reference sensor 49.

Referring still to FIG. 4, in making these measurements, a battery 59 or DC power source will have its positive lead connected to one side of each of the sensors 45, 47 or 49. Each active sensor 45, 47 has its other side connected respectively to identical resistors 61, 63. In one embodiment, these resistors 61, 63 were chosen to be 20 ohms. The reference sensor 49 has its other side connected to a third resistor 65. In one embodiment, resistor 65 is chosen to be 390 ohms.

The opposite sides of the resistors 61, 63 and 65 are connected to negative side of the power source 59. The negative side of the power source 59 is also connected to a terminal C1 of a conventional analog voltage-to-digital data acquisition system or converter 67. The terminal C2 of the A/D converter 67 is connected to the junction of resistor 61 and primary active sensor 45. The terminal C3 is connected to the positive side of battery 59. The terminal C4 is connected to the junction of resistor 65 and reference sensor 49. The terminal C5 is connected to the junction of resistor 63 and the compensating active sensor 47. The A/D converter 67 is connected to a conventional computer 75.

In operation, the A/D converter 67 collects the analog voltages at its terminal C1, C2, C3, C4 and C5 and supplies these measurements to the computer 75 as digital data and volts for calculating the apparent velocity V. The computer has programmed into it the various constants and fluid properties listed above. The computer has been programmed to compute the velocity based on the formula above.

In one embodiment of FIG. 4, a prototype compensated thermal flux mass flowmeter was constructed having the following characteristics:
Sensor resistances at room temperature = 20 ohms
A = 0.25 sq. inches (Both sides of sensor included)
G = 0.04 inches
GC = 0.06 inches
W = 0.4 watts (nominal)
WC = 0.4 watts (nominal)

The following equations were programmed into the computer 29 to yield the desired quantities:
Resistance of primary active sensor 45:

Ra = 20*(C3−C2)/ (C2−C1) ohms.

Power being delivered to primary active sensor 45:

W = (C3−C2)*(C2−C1)/20 watts.

Resistance of compensating active sensor 47:

Rc = 20*(C3−C5)/(C5−C1) ohms.

Power being delivered to compensating active sensor 47:

$$WC = (C3 - C5) * (C5 - C1)/20 \text{ watts.}$$

Resistance of reference sensor 49:

$$Rr = 390 * (C3 - C4)/(C4 - C1) \text{ ohms.}$$

Temperature of primary active sensor 45:

$$DTa = 458.01 * (Ra - Ra \text{ @ ambient temperature})/Ra \text{ @ ambient temperature) degrees F.}$$

Temperature of compensating active sensor 47:

$$DTc = 458.01 * (Rc - Rc \text{ @ ambient temperature})/(Rc \text{ @ ambient temperature)} \text{ degrees F.}$$

Temperature of reference sensor 49:

$$DTr = 458.01 * (Rr - Rr \text{ @ ambient Temperature})/(Rr \text{ @ ambient temperature}) \text{ degrees F.}$$

Temperature rise of primary active sensor 45:

$$TR = DTa - DTr \text{ degrees F.}$$

Temperature rise of compensating active sensor 47:

$$TRC = DTc - DTr \text{ degrees F.}$$

This prototype was tested in both air and water fluid flow using the following relationships for the apparent velocity V:

For Air:
$$V = 0.1394 * [LN(1.5 * TR * WC/TRC * W)/0.02] \text{SQUARED fpm.}$$

For Water:
$$V = 0.001119 * [LN(1.5 * TR * WC/TRC * W)/0.02] \text{SQUARED fpm.}$$

The thermal constants used in the above equations were as follows:

|  | AIR | WATER |
| --- | --- | --- |
| Thermal Capacity C (BTU/LbF) | 0.24 | 1.00 |
| Thermal Conductivity K (BTU In/HrSqFtF) | 0.16 | 4.15 |
| Density D (Lb/CuIn) | 0.0000456 | 0.036 |

The resulting output velocities were found to have significant improved linearity in the extreme intervals from 1 to 10 fpm and 1000 to 10,000 fpm in the case of air. In the case of water, significant improvements were found in the ranges of 0.01 to 0.1 fpm and 3 to 30 fpm. The linearity at high and low fluid velocities has significantly improved due to the reduction of the effects of thermal flux distortion and fluid viscosity. The velocity of homogeneous mixtures of varying fluid types can now be accurately measured simply by applying a weighting factor representative of the average thermal properties of the mixture to the velocity calculation.

The performance can be improved even further by utilizing for G and GC values which reflect the active effective gaps. These are gaps which one would use if the fluid velocity profile were in fact uniform.

While this invention has been shown in only four of its forms, it should be apparent to those skilled in the art that it is not so limited, but is susceptible to various changes without departing from the scope of the invention.

I claim:

1. A flowmeter for measuring the velocity of a fluid, comprising in combination:
   first and second sensors adapted to be placed in the fluid, the sensors being capable of generating heat when supplied with electrical power;
   a first heat sink located in the fluid a first gap from the first sensor in a direction substantially perpendicular to the direction of fluid flow;
   a second heat sink located in the fluid a second gap from the second sensor in a direction substantially perpendicular to the direction of fluid flow, the dimension of the second gap being different from the dimension of the first gap;
   means for supplying electrical power to the sensors to cause a thermal flux to flow across the first gap from the first sensor to the first heat sink, and to cause a thermal flux to flow from the second sensor across the second gap to the second heat sink; and
   means for computing the temperature rise of each of the sensors over the ambient temperature of the fluid by measuring the resistance of the sensors with power supplied and subtracting from these measurements their respective resistances at ambient temperature, for dividing the temperature rise of one of the sensors by the temperature rise of the other of the sensors to determine a ratio, and for computing from that ratio and the power supplied to each of the sensors, the velocity of the fluid.

2. The flowmeter according to claim 1 wherein the sensors are spaced apart from each other in a direction substantially perpendicular to the direction of fluid flow.

3. The flowmeter according to claim 1, further comprising isolation means for isolating one sensor from the thermal flux of the other sensor.

4. The flowmeter according to claim 1, wherein each sensor is isolated from any heat generated by the other.

5. The flowmeter according to claim 1, wherein the measuring means computes the fluid velocity by the following equation:

$$V = (K/CONSTANT2 * C * D) * [LN(TR * GC * WC/TRC * G * W)/(GC - G)] \text{SQUARED.}$$

wherein:
V = velocity of the fluid
K = thermal conductivity of the fluid
CONSTANT2 is a constant depending upon the units of measurement
C = thermal capacity or specific heat of the fluid
D = density of the fluid
G = gap distance of the first sensor
GC = gap distance of the second sensor
WC = power supplied to the second sensor
W = power supplied to the first sensor
TRC = temperature increase of the second sensor when supplied with power over the ambient temperature of the fluid TR=temperature increase of the first sensor when supplied with power over the ambient temperature of the fluid.

6. A flowmeter for measuring the velocity of a fluid, comprising in combination:

first and second sensors adapted to be placed in the fluid, the sensors being capable of generating heat when supplied with electrical power;

first and second heat sinks located in the fluid, separated by a first gap with the first sensor being positioned between them;

a third heat sink located in the fluid on the opposite side of the second sensor from the second heat sink, with the second sensor being positioned between the second and third heat sinks, the second and third heat sinks being separated by a second gap, the dimension of the second gap being different from the dimension of the first gap;

means for supplying electrical power to the sensors to cause a thermal flux to flow from the first sensor to the first heat and second heat sinks, and to cause a thermal flux to flow from the second sensor to the second and third heat sinks; and means for computing the temperature rise of each of the sensors over the ambient temperature of the fluid, by measuring the resistances of the sensors with power supplied and subtracting from these measurements their respective resistances at ambient temperature, for dividing the temperature rise of one of the sensors by the temperature rise of the other of the sensors to determine a ratio, and for computing from that ratio and the power supplied to each of the sensors, the velocity of the fluid.

7. The flowmeter according to claim 6 wherein the sensors are spaced apart from each other in a direction substantially perpendicular to the direction of fluid flow.

8. A flowmeter for measuring the velocity of a fluid, comprising in combination:

an active sensor, a compensating sensor and a reference sensor adapted to be placed in the fluid, the sensors being capable of generating heat when supplied with electrical power;

a plurality of heat sinks located in the fluid, with each of the sensors located between two of the heat sinks and separated from the other sensors by at least one of the heat sinks;

the active sensor being between two of the heat sinks which are separated from each other by a selected first gap;

the compensating sensor being positioned between two of the heat sinks which are separated from each other by a selected second gap that differs from the first gap;

the reference sensor being located between two of the heat sinks;

means for supplying electrical power to the active and compensating sensors to cause a thermal flux to flow from the active sensor to the heat sinks adjacent the active sensor and to cause a thermal flux to flow from the compensating sensor to the heat sinks adjacent the compensating sensor;

means for supplying electrical power to the reference sensor at a substantially lower level than the power supplied to the active and the compensating sensors; and means for measuring the temperature of each of the sensors when supplied with power, for subtracting the temperature of the reference sensor from the temperatures of the active and compensating sensors to determine temperature rises, for determining a ratio of the temperature rises, and for computing from that ratio and the power supplied to each of the sensors, the velocity of the fluid.

9. The flowmeter according to claim 8 wherein the measuring means determines the ratio by dividing the temperature rise of the active sensor by the temperature rise of the compensating sensor.

10. The flowmeter according to claim 8 wherein the reference sensor is located equidistant between two of the heat sinks.

11. A method of measuring the velocity of a fluid, comprising in combination:

placing first and second sensors in the fluid, the sensors being capable of generating heat when supplied with electrical power, and isolating each sensor from the heat generated by the other;

placing a first heat sink a first gap from the first sensor in a direction substantially perpendicular to the direction of fluid flow;

placing a second heat sink a second gap from the second sensor in a direction substantially perpendicular to the direction of fluid flow, and making the dimension of the second gap different from the dimension of the first gap;

supplying electrical power to the sensors to cause a thermal flux to flow across the first gap from the first sensor to the first heat sink, and to cause a thermal flux to flow from the second sensor across the second gap to the second heat sink; and computing the temperature rise of each of the sensors when supplied with power over the ambient temperature of the fluid by measuring the resistances of the sensors with power supplied and subtracting from these measurements their respective resistances at ambient temperature;

dividing the temperature rise of one of the sensors by the temperature rise of the other of the sensors to determine a ratio; and computing from that ratio and the power supplied to each of the sensors, the velocity of the fluid.

12. The method according to claim 11 wherein the sensors are isolated from the heat generated by the other by placing another heat sink between the sensors.

13. The method according to claim 11, wherein the fluid velocity is computed by the folloWing equation:

$$V = (K/CONSTANT2 * C * D) * [LN(TR * GC * WC / TRC * G * W)/(GC - G)] SQUARED.$$

wherein:

V = velocity of the fluid
K = thermal conductivity of the fluid
CONSTANT2 is a constant depending upon the units of measurement
C = thermal capacity or specific heat of the fluid
D = density of the fluid
G = gap distance of the first sensor
GC = gap distance of the second sensor
WC = power supplied to the second sensor
W = power supplied to the first sensor
TRC = temperature rise of the second sensor when supplied with power over the ambient temperature of the fluid TR = temperature rise of the first sensor when supplied with power over the ambient temperature of the fluid.

14. A method for measuring the velocity of a fluid, comprising in combination:
   providing an active sensor, a compensating sensor and a reference sensor, the sensors being capable of generating heat when supplied with electrical power;
   providing a plurality of heat sinks, and placing one of the heat sinks between each of the sensors;
   placing the active sensor between two of the heat sinks which are separated from each other by a selected first gap;
   placing the compensating sensor between two of the heat sinks which are separated from each other by a selected second gap which differs in dimension from the first gap;
   placing the reference sensor between two of the heat sinks;
   supplying electrical power to the active and compensating sensors to cause a thermal flux to flow from the active sensor to the adjacent heat sinks and to cause a thermal flux to flow from the compensating sensor to the heat sinks adjacent the compensating sensor;
   supplying electrical power to the reference sensor at a substantially lower level than the power supplied to the active and the compensating sensor; and
   measuring the temperature of each of the sensors when supplied with power;
   subtracting the temperature of the reference sensor from the temperatures of the active and compensating sensors to determine temperature rises;
   determining a ratio of the temperature rises; and
   computing from that ratio and the power supplied to each of the sensors, the velocity of the fluid.

15. A flowmeter for measuring the velocity of a flowing fluid, comprising in combination:
   an active sensor, a compensating sensor, and a reference sensor, the sensors being capable of generating heat when supplied with electrical power;
   first, second, and third heat sinks carried with the sensors, the first heat sink positioned a selected distance from the active sensor, the second heat sink positioned at a different selected distance from the compensating sensor, and the third heat sink positioned at a third selected distance from the reference sensor;
   means for supplying electrical power to the active and compensating sensors to cause a thermal flux to flow from said active sensor to said first heat sink, and a thermal flux to flow from said compensating sensor to said second heat sink;
   means for supplying electrical power to said reference sensor tat a level substantially lower than the power supplied to said active and compensating sensors;
   computing means for measuring temperatures rises of and the power supplied to each of said sensors, and for computing from said measurements the velocity of the fluid.

16. The flowmeter according to claim 15 wherein said computing means determines the temperature rises of said active and compensating sensors by respectively subtracting from the measured temperatures of said sensors the measured temperature of the reference sensors, forms a ratio of said temperature rises of said active and compensating sensors, and from said ratio and the power supplied to each of the sensors computes the velocity of the fluid.

17. A flowmeter for measuring the velocity of a fluid, comprising in combination:
   first and second sensors adapted to be placed in the fluid, the sensors being capable of generating heat when supplied with electrical power;
   a first heat sink located in the fluid a first gap from the first sensor in a direction substantially perpendicular to the direction of fluid flow;
   a second heat sink located in the fluid a second gap from the second sensor in a direction substantially perpendicular to the direction of fluid flow, the dimension of the second gap being different from the dimension of the first gap;
   means for supplying electrical power to the sensors to cause a thermal flux to flow across the first gap from the first sensor to the first heat sink, and to cause a thermal flux to flow from the second sensor across the second gap to the second heat sink; and
   means for measuring the temperature rise of each of the sensors over the ambient temperature, and for computing from said temperature rises and the power supplied to each of the sensors, the velocity of the fluid.

18. A method for measuring the velocity of a flowing fluid, comprising in combination:
   providing an active sensor, a compensating sensor, and a reference sensor, the sensors being capable of generating heat when supplied with electrical power;
   providing three heat sinks, and placing one of these adjacent to each of the sensors, the gap separating said active sensor from said first heat sink being different than the gap separating said compensating sensor from said second heat sink;
   supplying electrical power to the active and compensating sensors to cause a thermal flux to flow from said active sensor to said first heat sink, and a thermal flux to flow from the compensating sensor to said second heat sink;
   supplying electrical power to the reference sensor at a substantially lower level than the power supplied to the active and compensating sensors; and
   measuring the temperature of and the power supplied to each of said sensors, and computing from these measurements the velocity of the fluid.

19. The method according to claim 11, 14, or 18 wherein the fluid flows through a conduit having a wall, the wall of the conduit comprising at least one of the heat sinks.

20. The flowmeter according to claim 1, 6, 8 or 17 wherein the flowmeter is adapted to be mounted within a conduit having a wall, and wherein the wall of the conduit comprises at least one of the heat sinks.

* * * * *